(12) United States Patent
Hersant (10) Patent No.: US 11,519,443 B2
(45) Date of Patent: Dec. 6, 2022

(54) RIVETS

(71) Applicant: AVDEL UK LIMITED, Sheffield (GB)

(72) Inventor: Carl Hersant, Hertford (GB)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/491,936

(22) Filed: Oct. 1, 2021

(65) Prior Publication Data

US 2022/0018375 A1    Jan. 20, 2022

Related U.S. Application Data

(63) Continuation of application No. 15/884,808, filed on Jan. 31, 2018, now abandoned, which is a (Continued)

(30) Foreign Application Priority Data

Aug. 14, 2015    (GB) .................................... 1514543

(51) Int. Cl.
     *F16B 19/10*      (2006.01)
     *B21J 15/04*      (2006.01)

(52) U.S. Cl.
     CPC ......... *F16B 19/1054* (2013.01); *B21J 15/045* (2013.01); *F16B 2019/1009* (2013.01); *Y10T 29/49945* (2015.01)

(58) Field of Classification Search
CPC . B21J 15/045; F16B 19/1054; F16B 19/1045; F16B 2019/1009; Y10T 29/49945
See application file for complete search history.

(56) References Cited

U.S. PATENT DOCUMENTS

| 3,302,510 A | * | 2/1967 | Gapp | ..................... B21J 15/045 |
| | | | | 411/43 |
| 4,765,010 A | * | 8/1988 | Jeal | ........................ B21H 3/022 |
| | | | | 470/11 |

(Continued)

FOREIGN PATENT DOCUMENTS

| EP | 3334943 B1 | * | 10/2019 | ............ B21J 15/045 |
| GB | 2177770 A | | 1/1987 | |

(Continued)

OTHER PUBLICATIONS

International Search Report & Written Opinion dated Nov. 2, 2016 cited in corresponding PCT Application No. PCT/EP2016/068943.

*Primary Examiner* — Bayan Salone
(74) *Attorney, Agent, or Firm* — Kofi A. Schulterbrandt (57) ABSTRACT

A rivet for fastening workpiece members, the rivet including a body comprising a shank extending in a first, longitudinal direction and a head extending in a second, substantially transversal direction, a bore being defined through the shank and the head of the body; and, a stem comprising a main longitudinal portion arranged for insertion into said bore, and an enlarged portion arranged for radially expanding the shank when the enlarged portion is forced into said bore to fasten the workpiece members; the rivet being configured for insertion into respective apertures formed in the workpiece members; and the rivet being further configured such that when the workpiece members are fastened, the head of the body of the rivet is displaced relative to the shank to engage with the stem to lock the stem in place relative to the body and/or the workpiece members.

20 Claims, 13 Drawing Sheets

Related U.S. Application Data continuation of application No. PCT/EP2016/068943, filed on Aug. 9, 2016.

(56) References Cited

U.S. PATENT DOCUMENTS

| | | | | |
|---|---|---|---|---|
| 4,781,501 A * | 11/1988 | Jeal | ...................... | F16B 19/1054 411/69 |
| 4,826,372 A * | 5/1989 | Kendall | .............. | F16B 19/1054 411/70 |
| 4,904,133 A * | 2/1990 | Wright | ................ | F16B 19/1054 29/512 |
| 5,551,040 A * | 8/1996 | Blewett | ................. | G06F 9/4484 712/E9.082 |
| 6,551,040 B1 * | 4/2003 | Terry | ................... | F16B 19/1072 411/45 |
| 8,096,742 B2 * | 1/2012 | Davies | ................ | F16B 19/1054 411/500 |
| 9,267,524 B2 * | 2/2016 | Brewer | .............. | F16B 19/1054 |
| 2011/0206477 A1 * | 8/2011 | Brewer | .............. | F16B 19/1054 470/27 |
| 2014/0286725 A1 * | 9/2014 | Schneider | ................ | F16B 35/06 411/43 |
| 2018/0149183 A1 * | 5/2018 | Hersant | .................. | B21J 15/045 |

FOREIGN PATENT DOCUMENTS

| | | | | | |
|---|---|---|---|---|---|
| GB | | 2464674 C | * | 4/2013 | .......... F16B 19/1054 |
| GB | | 2541248 A | * | 2/2017 | ............. B21J 15/045 |
| WO | WO-2017029155 A1 | * | 2/2017 | ............. B21J 15/045 |

\* cited by examiner

RIVETS

CROSS-REFERENCE TO RELATED APPLICATIONS

This application is a continuation of U.S. application Ser. No. 15/884,808, filed Jan. 31, 2018 which is a continuation application of International Application PCT/EP2016/068943 with an international filing date of Aug. 9, 2016 which claims priority from United Kingdom Patent Application No. GB1514543.6, filed Aug. 14, 2015, the disclosure of which is incorporated herein by reference in its entirety.

FIELD OF THE INVENTION

The invention relates to rivets (more accurately, rivet assemblies), for fastening workpiece members. In particular, it relates to blind rivets. More particularly, it relates to blind rivets of the break-stem type. Rivets according to the present invention are capable of providing locked fastening, i.e. a type of fastening whereby parts of the rivets are locked together to reduce or eliminate relative movement between those parts independently or in addition to interactions due to the fastening itself.

BACKGROUND OF THE INVENTION

Blind rivet assemblies (henceforth, "rivets") of the type described in this application are used to fasten together workpiece members. Workpiece members may, for example, take the form of sheets of material or interconnecting members, such as tubular members, which need to be fastened together so that their relative movement is constrained or prevented.

To fasten the workpiece members together, a blind rivet is passed through corresponding apertures in the workpiece members and then set in position using a tool which applies a pulling force to a stem component/part of the rivet (henceforth, "stem"). The pulling force applied to the stem causes deformation of a body component/part of the rivet (henceforth, "body") on the "blind" side of the fastener, i.e. on the opposite side of the workpiece from the side on which the tool is applied. The deformation of the body typically results in a deformed portion of the body being in contact with the blind side of the workpiece, while a head of the body is in contact with the other side of the workpiece. The workpiece members are thus fastened (i.e. held or clamped together) by and between the deformed portion of the body and the head of the body.

The strength of such a fastening and the ability of a set rivet to continue constraining relative movement of the workpiece members can be compromised if, once the rivet has been set, the body and the stem are able to move relative to each other. For example, if the rivet is a breakstem rivet (wherein a part of the stem is broken off in the course of the setting operation so that the stem protrudes less or does not protrude at all from the body head), the portion of the stem left in the body may recoil and move within the body, towards the blind side of the workpiece. The stem can also be caused to move within the body by vibration of the workpiece members or continued stress applied to the joint. Even a small movement of the stem relative to the body can reduce the effectiveness of the fastening. In some cases, the stem may make its way completely out of the body. This can in addition significantly reduce the shear strength of the fastening, i.e. the ability of the fastener to constrain or prevent movement of the workpiece members in directions substantially orthogonal to the longitudinal axis of the fastener.

Locking features that mitigate the aforementioned problems in rivets are known and come in several different configurations.

Some rivets comprise a shoulder in the body bore which impacts a mating shoulder on the stem to force material, locally, to deform radially inwardly into a stem locking groove immediately below the stem shoulder to form the lock. The strength of this lock is only sufficient to resist recoil for smaller rivets.

Other types of internal locks involve a locking "lip" formed in the head bore. The locking lip is displaced into a locking groove formed in the stem when the rivet is set. However, these locks are difficult to form and also have limited strength.

Other locks may comprise a folding skirt on the stem which his splayed out by a special lipped nose tip of the placing tool, and which locks into a counterbore in the top of the rivet body head. However, these designs cannot be applied to stems of high hardness, as the folding skirt would become brittle and liable to wear the corresponding lip of the tool nose tip.

In at least some embodiments, the invention aims to go some way towards solving or at least mitigating the problems set out above.

In at least some embodiments, the invention aims to provide a simpler locking blind rivet design compared to the prior art.

In at least some embodiments, the invention aims to provide a robust lock suited to relatively large workpiece members which may require relatively large apertures and rivets comprising stems having high tensile strength (and thus being particularly prone to recoiling).

SUMMARY OF THE INVENTION

According to an embodiment of the invention there is provided a rivet for fastening workpiece members, the rivet comprising: a body comprising a shank extending in a first, longitudinal direction and a head extending in a second, substantially transversal direction, a bore being defined through the shank and the head; and a stem comprising a main longitudinal portion arranged for insertion into said bore, and an enlarged portion arranged for radially expanding the shank when the enlarged portion is forced into said bore to fasten the workpiece members; the rivet being configured for insertion into respective apertures formed in the workpiece members; and the rivet being further configured such that when the workpiece members are fastened, the head of the body of the rivet undergoes displacement relative to the shank to engage with the stem to lock the stem in place relative to the body and/or the workpiece members.

In preferred embodiments, the main longitudinal portion of the stem comprises at least one stem locking feature to facilitate the engaging of the head of the body of the rivet with the stem. The at least one stem locking feature may for example comprises a stem shoulder and/or a stem groove.

In preferred embodiments, the head of the body of the rivet comprises at least one body locking feature to facilitate the engaging of the head of the body of the rivet with the stem. The at least one body locking feature may comprise an inner body shoulder and/or an inner body groove, for instance.

In some embodiments, the head has an outer curved or domed profile, and said head optionally has a flat or curved underhead contact surface for abutment against a corresponding respectively flat or curved surface of one of the workpiece members.

Preferably, the displacement of the head comprises pivoting of at least a portion of the head around a region of the head constrained between a surface of one of the workpiece members and an outer rim of a tool for setting the rivet. At least a substantial portion of the head may undergo yielding to enable said displacement to lock the stem in place relative to the body and/or the workpiece members.

Optionally, the body is formed as a single piece and/or is made of steel, optionally in an annealed condition. Analogously, the stem may be formed as a single piece and/or be made from steel, optionally in a hardened condition.

The body shank may have a plain cylindrical outer profile, or be splined. Optionally the body shank may include a voided section.

Preferably, the enlarged portion of the stem comprises a tapered section arranged to facilitate the radial expansion of at least part of the body shank.

Optionally, the workpiece comprises a curved surface for abutment with the head of the body of the rivet.

According to another embodiment of the invention there is provided a method of fastening workpiece members using a rivet comprising a body having a shank extending in a first, longitudinal direction and a head extending in a second, substantially transversal direction, a bore being defined through the shank and the head of the body, and a stem having a main longitudinal portion arranged for insertion into said bore, and an enlarged portion arranged for radially expanding the shank, the method comprising: inserting the rivet into respective apertures formed in the workpiece members; forcing the enlarged portion into said bore to fasten the workpiece members; and displacing the head of the body of the rivet relative to the shank to engage with the stem to lock the stem in place relative to the body and/or the workpiece members.

Preferably, the step of displacing the head of the body relative to the shank to engage with the stem to lock the stem in place relative to the body and/or the workpiece member is performed immediately subsequently, and optionally as a result of a continuation of a same action responsible for the step of forcing the enlarged portion into the bore to fasten the workpiece members.

BRIEF DESCRIPTION OF THE DRAWINGS

Specific embodiments of the invention will now be described by way of non-limiting examples, in which.

DETAILED DESCRIPTION

The present embodiments represent the best ways currently known to the applicant of putting the invention into practice, but they are not the only ways in which this can be achieved. They are illustrated, and they will now be described, by way of example only.

Figure 1:
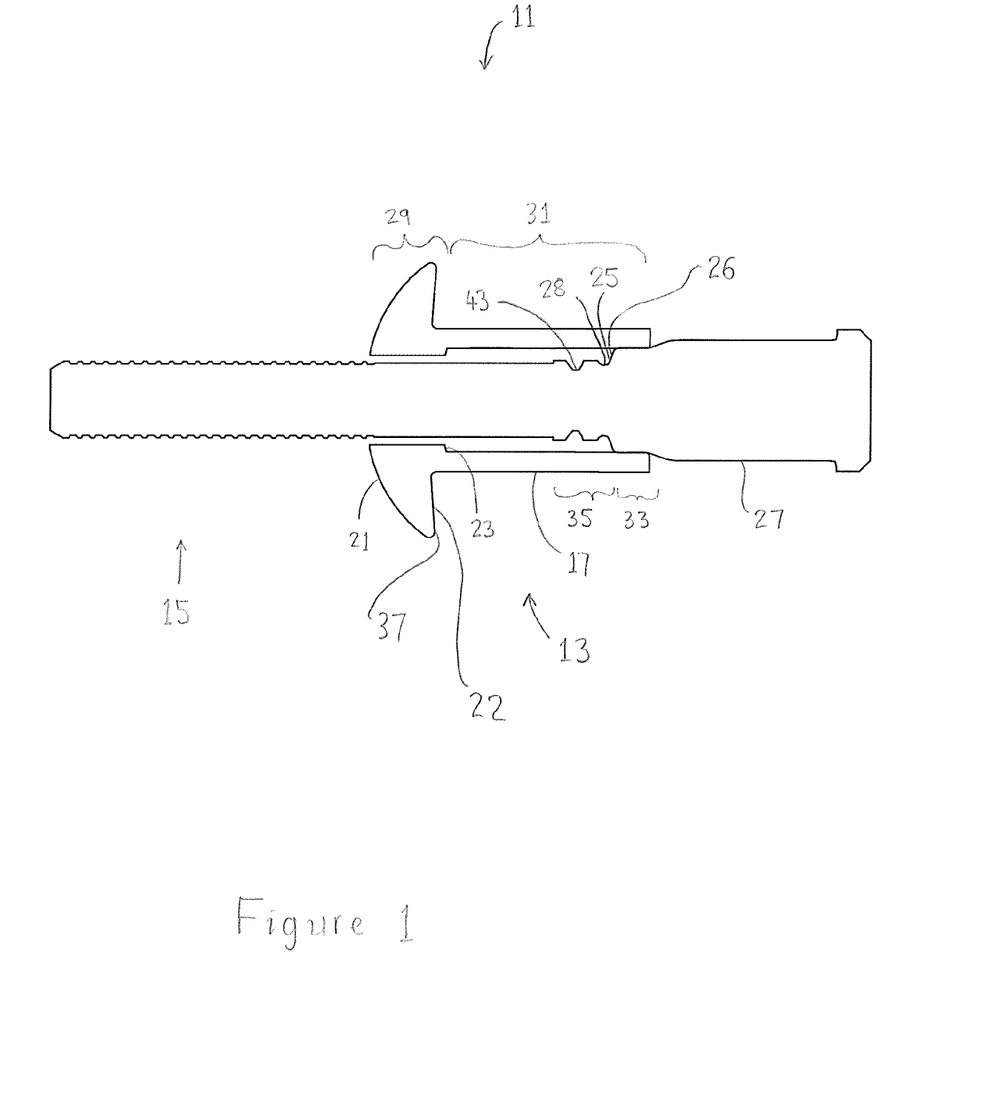
FIG. 1 illustrates in cross section a rivet assembly according to an embodiment of the invention.

In FIG. 1 a blind breakstem rivet assembly 11 is illustrated. The fastener 11 includes a body 13 and a stem 15. The body 13 defines an axial bore along its length, inside which the stem 15 is received and positioned. The body 13 includes a body shank 17 and a radially enlarged body head 21.

The body shank 17 extends substantially in a first direction, approximately parallel to the axis of the fastener 11, i.e. approximately parallel to the longitudinal axis of the body 13 and to the longitudinal axis of the stem 15. Prior to setting of the fastener 11 in a workpiece (i.e. when the fastener 11 is in the condition illustrated in FIG. 1), the body head 21 is arranged such that an underhead contact surface 22 of the body head 21 (for contacting an outer surface of a workpiece such as the workpiece 19 illustrated in FIGS. 2 to 7 or the workpiece 119 illustrated in FIGS. 8 to 13) lies substantially in one plane, i.e. is approximately flat. The plane is approximately orthogonal to the first direction, i.e. approximately orthogonal to the longitudinal axis of the body 13 and to the longitudinal axis of the stem 15. In the illustrated example, the body head 21 has a domed outer surface against which an installation tool will be pushed during setting of the fastener 11 (see FIGS. 2 to 7 and FIGS. 8 to 13). In other examples, the body head 21 may have a different outer surface profile, such as a flat or stepped profile.

In the described embodiment, the rivet body 13 also includes a body locking feature 23. As the skilled person will appreciate, the locking mechanism of the rivet is in addition to the main fastening mechanism. In the illustrated example, the body locking feature 23 is a shoulder 23 in the interior of the body 13, i.e. on the internal wall defining the axial bore of the body 13. The shoulder 23 is at the transition between a region 29 of reduced bore diameter at the head end of the body 13 (i.e. the end of the body 13 where the head 21 is located) and a region 31 of greater bore diameter closer to the tail end of the body 13 (i.e. the opposite end of the body 13 from the head end).

In other examples, the locking feature 23 may take different forms. The locking feature 23 may for example be a protrusion which protrudes radially inwardly from the internal wall of the body 13 (i.e. the wall defining the axial bore of the body 13) and extends for only a short distance along the axis of the body 13. The protrusion may extend all the way round the circumference of the bore of body 13, forming a continuous, annular protrusion in a plane substantially orthogonal to the longitudinal axis of the fastener 11, or extend only part way round the bore of the body 13. If the protrusion extends only part way round the bore of the body 13, there may be several protrusions spaced around the circumference of the bore of body 13.

The body locking feature 23 is configured (e.g. sized and shaped) such that it corresponds approximately to a stem locking feature 25. In the illustrated example, the stem locking feature 25 comprises a shoulder 26 and a groove 28 in the outer surface of the stem 15. The shoulder 26 extends round the circumference of the stem 15, forming a continuous, annular shoulder in a plane substantially orthogonal to the longitudinal axis of the stem 15. The groove 28 similarly extends round the circumference of the stem 15, forming a continuous annular groove in a plane substantially orthogonal to the longitudinal axis of the stem 15. The shoulder 26 is at the transition between a region 33 of greater stem diameter and a region 35 of narrower stem diameter. The groove 28 is in the region 35 of narrower stem diameter and is of narrower diameter than the portions of stem 15 axially immediately either side of the groove 28.

In other examples, the stem locking feature 25 may take different forms. The shoulder and/or the groove may, in some examples, not be continuous, i.e. may extend only part way round the circumference of the stem 15. In such cases, there may be several separate shoulders and/or grooves spaced around the circumference of the stem 15. The separate shoulders and/or grooves may give the stem locking feature 25 a castellated appearance.

The stem 15 includes a stem enlarged portion 27. During installation of the fastener 11 in a workpiece 19 (see FIGS. 2 to 7 and FIGS. 8 to 13), a pulling force is applied to the stem 15 by an installation tool 51 at the opposite end of the stem 15 from the enlarged portion 27. The pulling force draws the stem 15 through the body 13, towards the head end of the body 13 (towards the left in the examples of FIGS. 1 to 7 and FIGS. 8 to 13). The stem enlarged portion 27 causes the shank 17 of the body 13 to deform radially outwardly as the enlarged portion 27 passes through the shank 17, as illustrated in FIGS. 2 to 7 and FIGS. 8 to 13. This leads to the formation of a radially enlarged bulb on the blind side of the workpiece 19 (i.e. the opposite side of the workpiece 19 from the side on which the installation tool 51 is applied). In the examples illustrated in the Figures, the right-hand side of the workpiece 19 is the blind side on which the enlarged bulb is formed.

Figure 2:
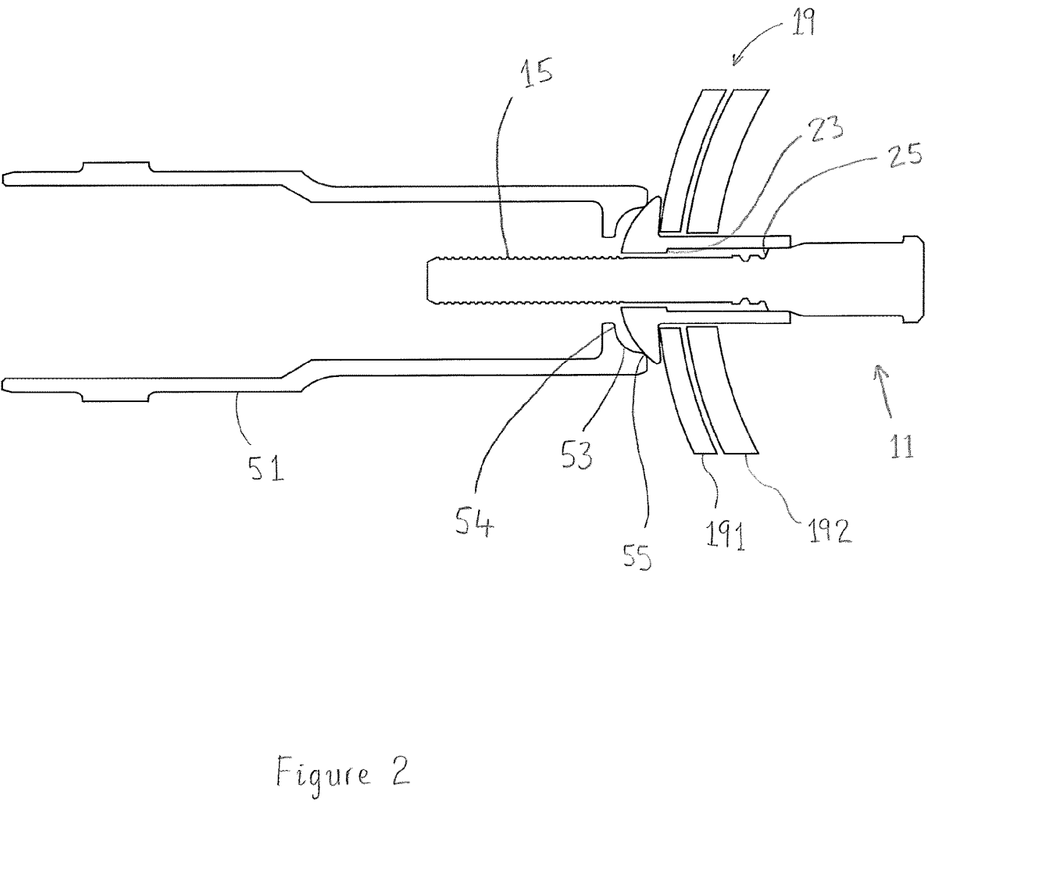
FIG. 2 illustrates in cross section the fastener of FIG. 1 after it has been installed in a tool and inserted through apertures in a workpiece and is at the beginning of a setting operation. In this figure and FIGS. 3 to 7, the pulling jaws and some other components of the tool have been omitted for clarity.

FIG. 2 shows the fastener 11 of FIG. 1 after it has been inserted into a workpiece 19 comprising two workpiece members 191 and 192. A tool 51 is pushed against the body head 21 and will be used to set the fastener 11 in the workpiece 19 by applying a pulling force to the stem 15. The skilled person will appreciate that the invention can be applied to two as well as more than two workpiece members simultaneously depending on specific applications.

Figure 3:
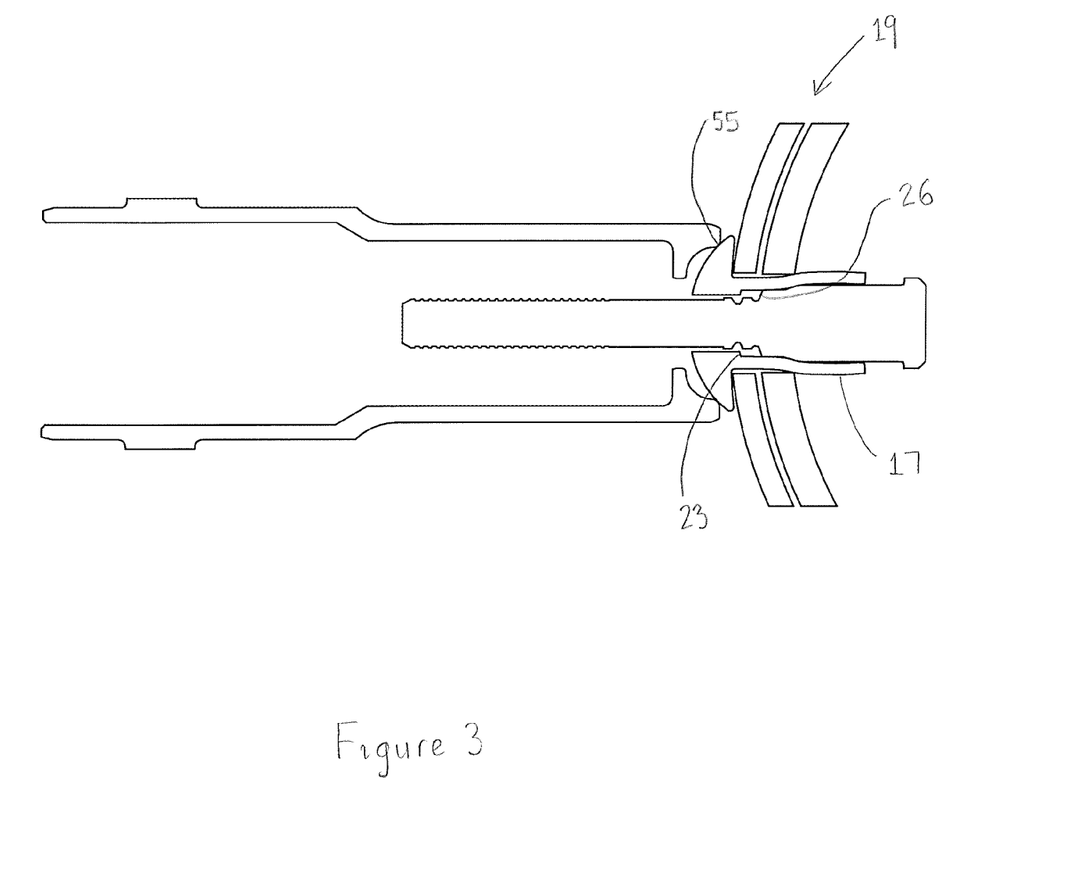
FIG. 3 illustrates in cross section the fastener of FIGS. 1 and 2 which is part way through the setting operation.

FIGS. 3 to 7 illustrate the movements of the body 13, the stem 15 and the workpiece 19 during the setting operation. In FIG. 3 the stem enlarged portion 27 has been drawn into the shank 17 of the body 13, causing the radially outward movement of the shank 17 described above. The shoulder 26 of the stem locking feature 25 is approaching the shoulder 23 that forms the body locking feature 23 in the illustrated example.

Figure 4:
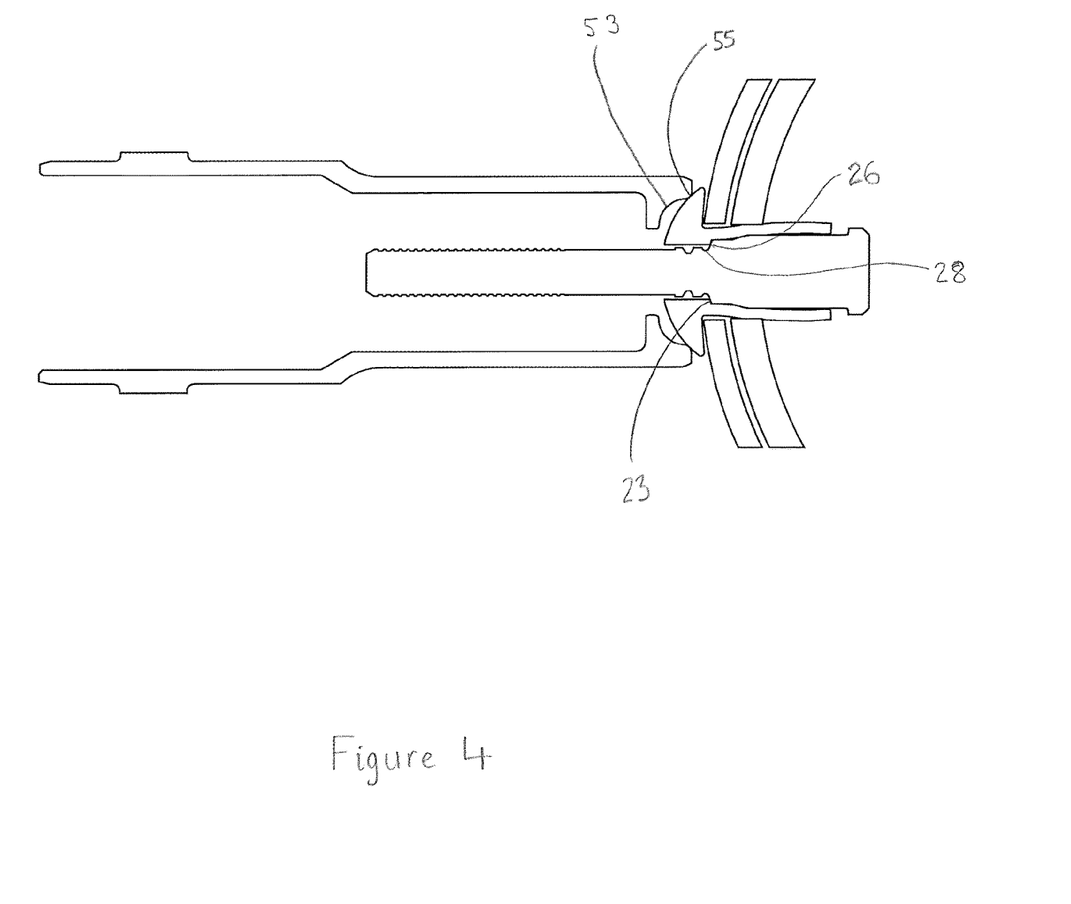
FIG. 4 illustrates in cross section the fastener of FIGS. 1 to 3 at a later stage in the setting operation.

When the stem 15 has been drawn sufficiently far through the body 13, the stem locking feature 25 and the body locking feature 23 will come into contact with one another. In the illustrated example, the shoulder 26 of the stem 15 will come into contact with the shoulder 23 of the body 13. This stage of the setting operation is illustrated in FIG. 4.

As the stem 15 is drawn still further through the body 13, a force is applied to the body locking feature 23 via the stem locking feature 25. The force applied to the body locking feature 23 promotes displacement/deformation of at least part of the body 13. The verbs "displace" and "deform" (and their derivatives) in this context mean any "change in shape or form or configuration" and are intended to include (but are not limited to) the body 13 changing in shape or configuration by rotation or pivoting of one or more parts of the body 13 relative to other parts of the body; and one or more parts of the body 13 elongating or contracting, e.g. by flow of material from one part of the body 13 to another part of the body 13. As will be described in more detail below, the displacement/deformation of the body 13 gives rise to a locking connection between the body 13 and the stem 15.

In the illustrated example, the shoulder 26 of the stem 15 applies a force to the shoulder 23 of the body 13 as the stem 15 is pulled by the installation tool. The force causes the body head 21 to deform/displace.

Figure 5:
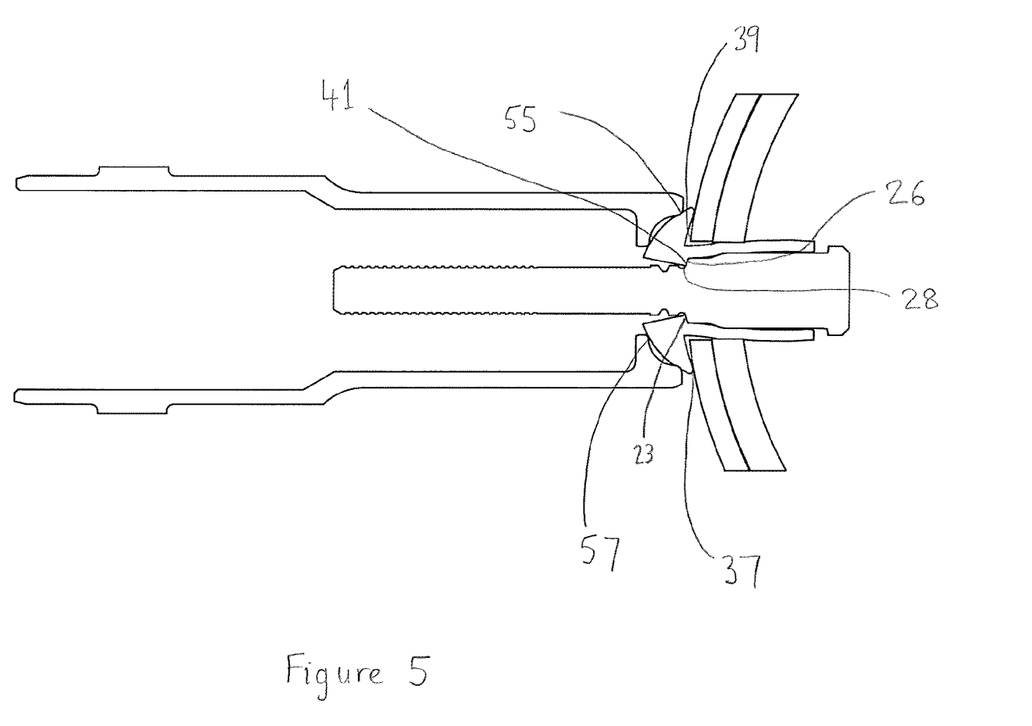
FIG. 5 illustrates in cross section the fastener of FIGS. 1 to 4 further through the setting operation.

FIG. 5 illustrates the fastener 11 at a later stage in the setting process, after the body locking feature 23 and the stem locking feature 25 have come into contact with each other and the body head 21 has begun to deform/displace. The force applied to the body 13 by the stem 15 has caused the body head 21 to pivot about the point at which the radially enlarged head 21 and the body shank 17 are connected. The head 21 has pivoted such that the radially outermost part 37 of the head 21 is still in contact with the workpiece 19, but an underhead recess 39 has been formed, leaving a gap between the workpiece 19 and part of the underhead contact surface 22 of the body head 21 that is radially inward of the radially outermost part 37. The underhead contact surface 22 no longer lies substantially in one plane, i.e. is no longer approximately flat.

Part of the shank 17 has been drawn through the aperture in the workpiece 19 and out onto the tool-side of the workpiece 19. This may be as a result of the whole of the shank 17 moving further towards the tool side of the workpiece 19, or as a result of part of the shank 17 deforming by elongating, depending on the extent of deformation of the tail end of the shank 17 through axial contraction and/or radial expansion.

When the fastener 11 has reached the stage of installation illustrated in FIG. 5, the body locking feature 23 (shoulder 23 in the illustrated example) is the radially innermost part 41 of the head 21. The shoulder 23 has pivoted about the point at which the head 21 is connected to the shank 17. The shoulder 23 is still in contact with the stem locking feature 25 (shoulder 26 in the illustrated example).

Figure 6:
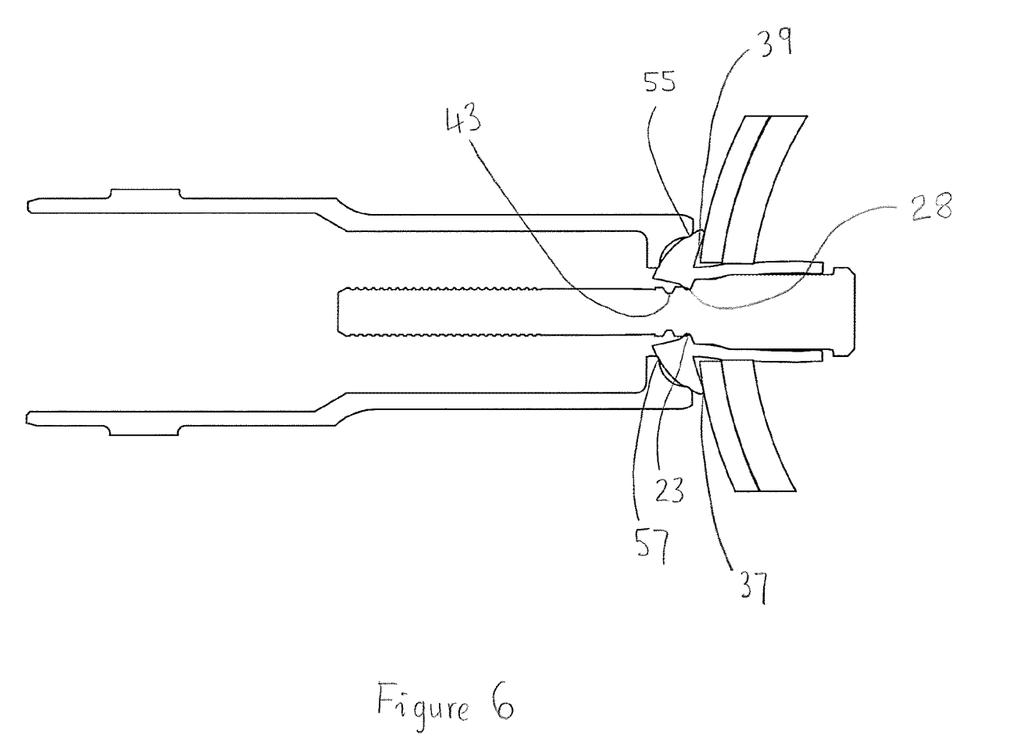
FIG. 6 illustrates in cross section the fastener of FIGS. 1 to 5 still further through the setting operation.

When the head 21 has pivoted sufficiently relative to the body shank 17, the head 21 will be prevented by the installation tool 51 from pivoting further, as will be described in more detail below. Continued or increased application of force to the stem 15 by the installation tool 51 may thereafter cause other types of deformation of the head 21 (i.e. distinct from pivoting of the head 21). It may, in particular, cause further displacement/deformation of the body locking feature 23 (shoulder 23) into the groove 28 on the stem 15 (if possible), and corresponding deformation of the head and/or shank material next to the body locking feature 23 to enable the deformation of the body locking feature 23. This deformation arises as a consequence of a contact force applied by the tool 51 to the head 21, wherein the contact force has a component which acts radially inwardly. Such deformation of the shoulder 23 to occupy more of the groove 28 is illustrated in FIG. 6.

Figure 7:
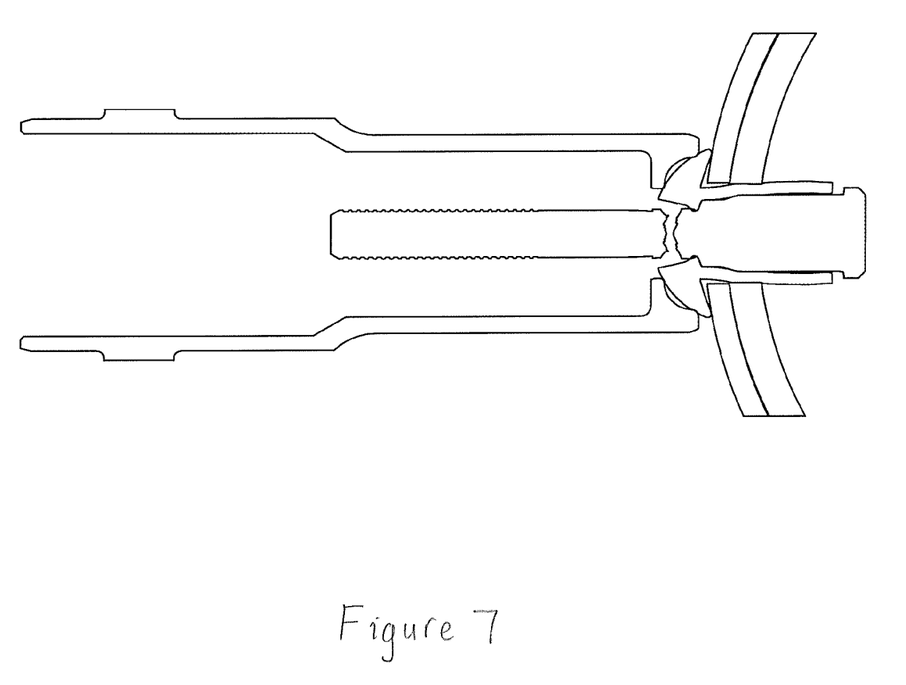
FIG. 7 illustrates in cross section the fastener of FIGS. 1 to 6 when the setting operation has been completed.

There will come a point at which further force applied to the stem 15 will cause the stem 15 to fracture at a break groove 43. After the stem 15 has fractured, part of the stem 15 is left within the body 13, and part of the stem 15 is removed by the tool. The fracturing of the stem 15 at the break groove 43 is illustrated in FIG. 7. The fracturing of the stem 15 completes the fastener installation process.

The deformation of the body 13 (including the pivoting of the head 21) during setting of the fastener 11 gives rise to locking engagement of the body locking feature 23 and the stem locking feature 25. In particular, the deformation of the head 21 causes the shoulder 23 to enter the groove 28 in the outer surface of the stem 15.

The engagement of the body locking feature 23 and the stem locking feature 25 constrains the relative movement of the body 13 and the stem 15. In particular, the fact that the shoulder 23 has entered the groove 28 limits the extent to which the stem 15 can slide axially within the bore of the body 13. Thus, the engagement of the body locking feature 23 and the stem locking feature 25 helps prevent the stem 15 from recoiling out of the body 13 when the stem 15 fractures at the break groove 43, and/or from being shaken loose from the body 13 by vibration of the workpiece 19 after the installation process.

Retaining the stem 15 within the body 13 in this way may improve the shear strength of the fastener 11, e.g. the ability of the fastener to constrain sliding of one workpiece member relative to the other in a direction substantially orthogonal to the longitudinal axis of the fastener 11, because of the strength of the material forming the stem 15.

Retaining the stem 15 within the body 13 may alternatively or additionally improve the tensile strength of the fastener, e.g. the ability of the fastener 11 to prevent separation of the workpiece members in a direction substantially parallel to the longitudinal axis of the fastener 11.

Figure 8:
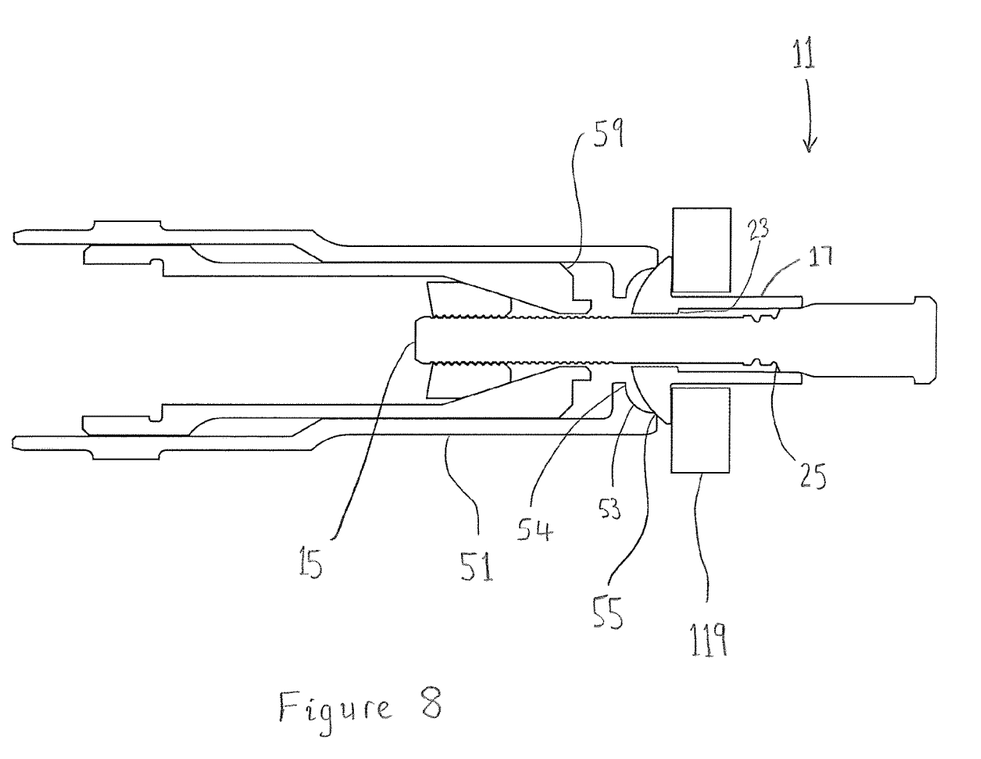
FIG. 8 illustrates in cross section a rivet assembly according to an embodiment of the invention after it has been installed in a tool and inserted through apertures in a differently shaped workpiece and is at the beginning of a setting operation. In this FIGURE and FIGS. 9 to 13, the pulling jaws of the tool have been included.
Figure 9:
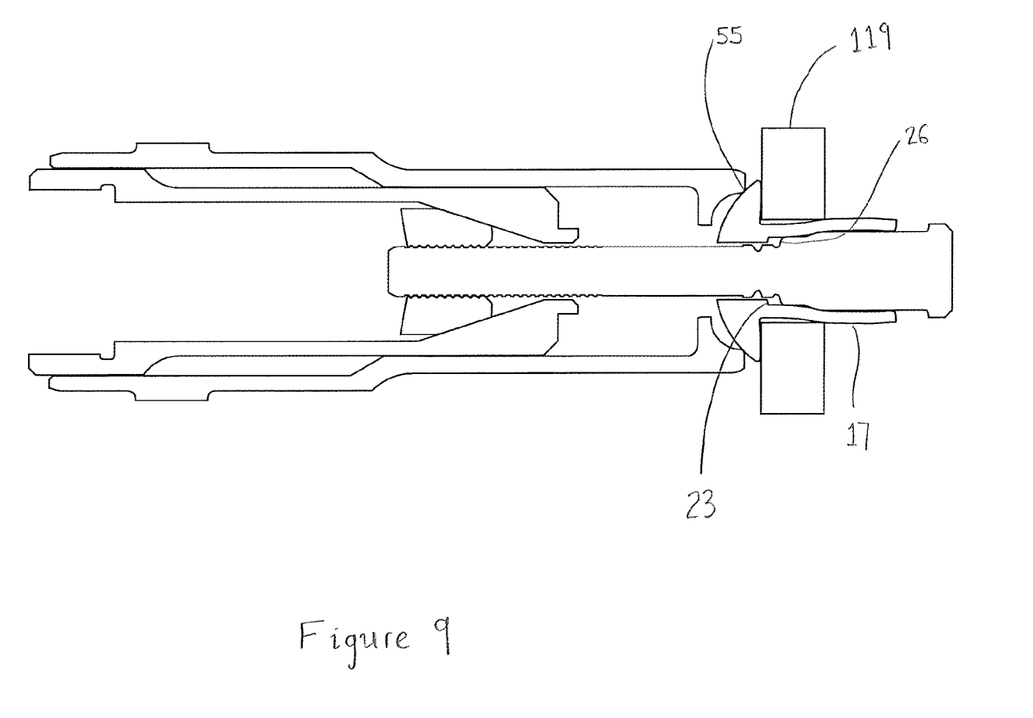
FIG. 9 illustrates in cross section the fastener of FIG. 8 which is part way through the setting operation.
Figure 10:
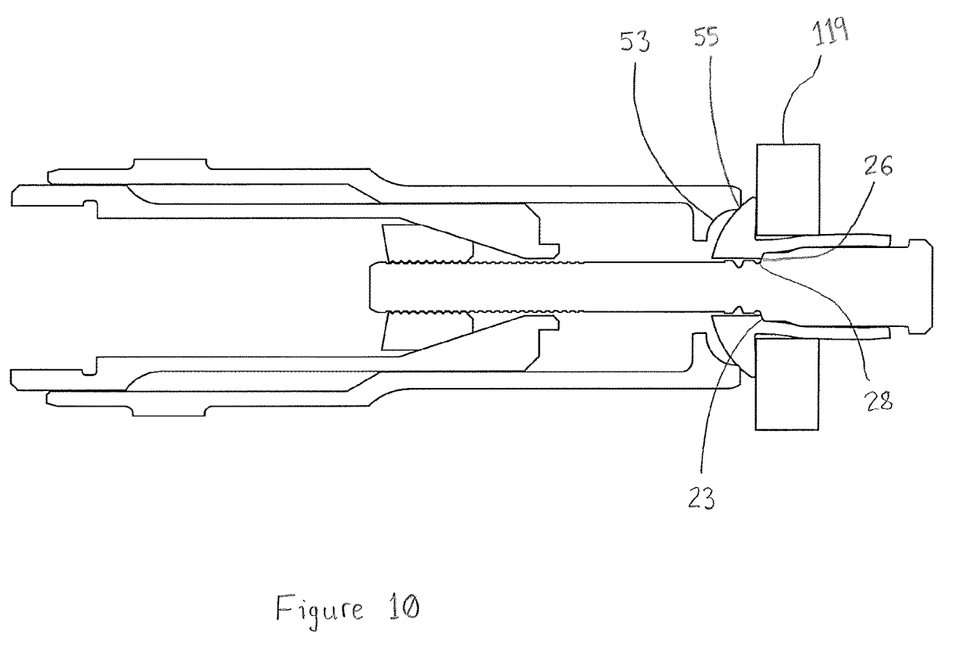
FIG. 10 illustrates in cross section the fastener of FIGS. 8 and 9 at a later stage in the setting operation.
Figure 11:
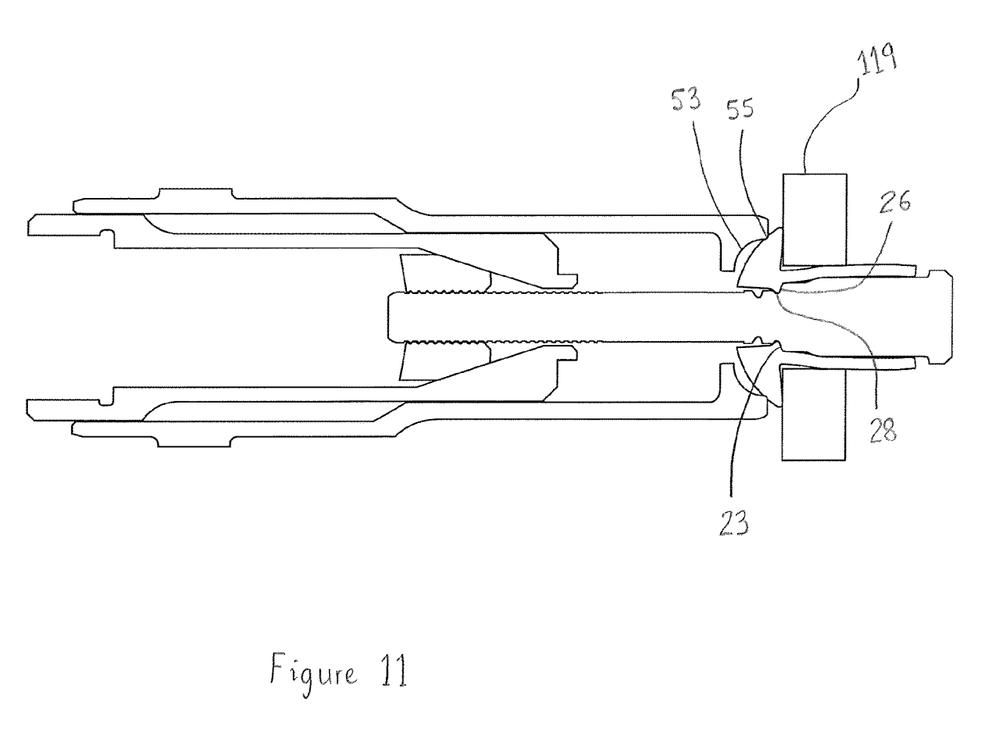
FIG. 11 illustrates in cross section the fastener of FIGS. 8 to 10 further through the setting operation.

As illustrated in FIGS. 2 to 7 and in FIGS. 8 to 13, the tool 51 for installing the fastener 11 has a contact face 53 (see, for example, FIG. 2 or FIG. 8). In the illustrated examples, the contact face 53 is a concave contact face. The approximate radius of curvature of the contact face 53 is smaller than the approximate radius of curvature of the outer surface of the body head 21. When the contact face 53 of the tool 51 is first pressed against the body head 21, the contact face 53 contacts the body head 21 only on a first contact ring 55 near the radially outermost portion of the contact face 53. There is a gap between the radially inward portion of the contact face 53 and the radially inward portion of the body head 21, as illustrated in FIGS. 2 to 4 and FIGS. 8 to 11.

Figure 12:
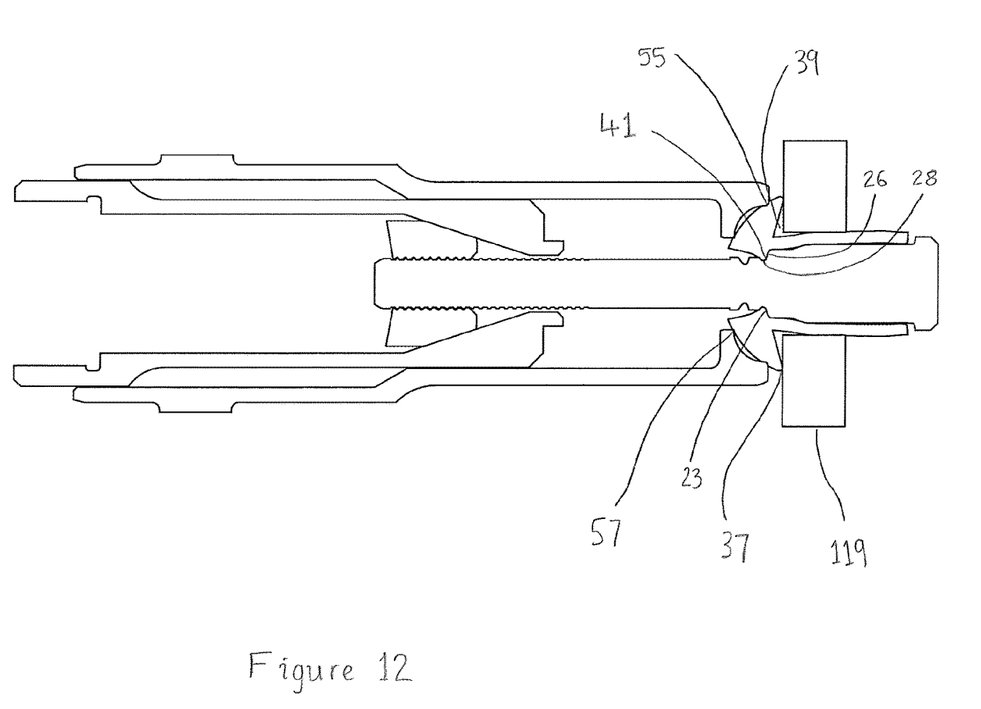
FIG. 12 illustrates in cross section the fastener of FIGS. 8 to 11 still further through the setting operation.
Figure 13:
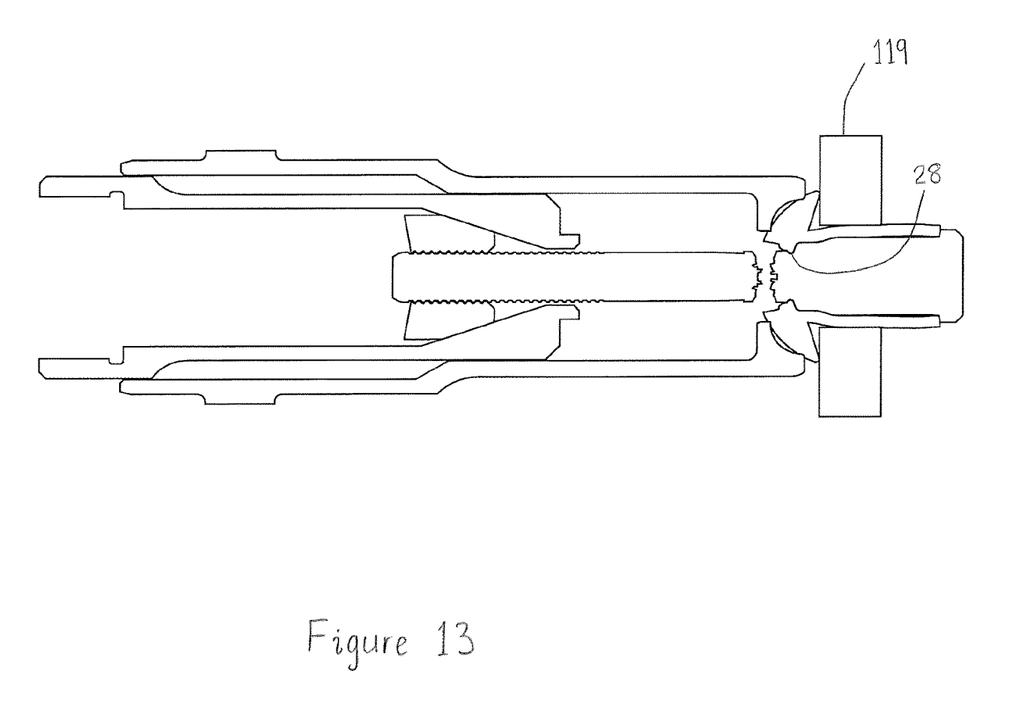
FIG. 13 illustrates in cross section the fastener of FIGS. 8 to 12 when the setting operation has been completed.

As the tool 51 pulls on the stem 15 to set the fastener 11 in position, the body head 21 pivots, as previously described. As the body head 21 pivots, the approximate radius of curvature of the domed body head 21 as a whole decreases, and the radially inward portion of the body head 21 approaches the radially inward portion of the contact face 53, closing the gap between the radially inward portion of the contact face 53 and the radially inward portion of the body head 21. The body head 21 eventually pivots to such an extent that the head 21 cannot pivot any further in that direction. This is because the radially inward portion of the head 21 comes into contact with the radially inward portion of the contact face 53 on a second contact ring 57, as illustrated in FIG. 5 and FIG. 12.

When the body head 21 is in contact with the contact face 53 on the second contact ring 57 and the stem 15 is pulled further, the body head 21 cannot pivot as it did previously.

The reaction force that the second contact ring 57 exerts against the surface of the body head 21 overcomes the force that tends to pivot the head 21. The reaction force has a component which is radially inward. The radially inward force applied to the body head 21 helps promote the deformation (e.g. extension and/or rounding) of the shoulder 23 into the groove 28. In this way, an axial force applied to the stem 15 by the tool 51 gives rise to a radially inward force applied to the body head 21. The radially inward force promotes deformation of the body locking feature 23 into the stem locking feature 25, thereby helping to constrain relative moment of the body 13 and the stem 15.

The tool 51 may be arranged such that the second contact ring 57 is at or near the most radially inward portion 54 of the contact face 53. Advantageously this may reduce marking of the body head 21 caused by application of the tool 51 to the fastener 11. The contact face 53 may include a substantially flat portion at the most radially inward portion 54, to further minimise marking of the body head 21 caused by the contact face 53. The contact face 53 may be arranged such that its inner radius is approximately equal to the radius of the bore through the body 13 for a given fastener 11.

As well as improving the strength of the fastening, the engagement of the body locking feature 23 and the stem locking feature 25 through the deformation of the body head 21 helps make the installed fastener more tamper-proof.

As discussed above, during setting of the fastener 11 in a workpiece, the domed body head 21 pivots about the point at which it is connected to the shank 17. As the head 21 pivots, the approximate radius of curvature of the head 21 as a whole decreases, and the radially inward portion of the outer surface of the body head 21 approaches the radially inward portion of the contact face 53, closing the gap between the radially inward portion of the contact face 53 and the radially inward portion of the body head 21. This deformation/displacement of the body head 21 allows the radially outermost part 37 of the head 21 to remain in contact with the workpiece, maintaining a better seal of the body head 21 against the workpiece. This effect is particularly advantageous when the fastener 11 is used with curved workpieces, as the radially outermost part 37 of the head 21 pivots and stays in contact with the curved surface of the workpiece.

In FIGS. 8 to 13 a fastener 11 according to an embodiment of the invention is shown being set in a flat workpiece 119 rather than a curved workpiece 19 as illustrated in FIGS. 2 to 7. Indeed, the fastener 11 may be used with various shapes of workpiece and is not intended to be limited to use with a curved workpiece or a flat workpiece.

The steps of the setting process illustrated in FIGS. 8 to 13 substantially correspond to the steps illustrated in FIGS. 2 to 7. In FIGS. 8 to 13, jaws 59 forming part of the installation tool 51 are shown. The jaws 59 (which were omitted from FIGS. 2 to 7) are included for illustrative purposes in FIGS. 8 to 13. The jaws 59 are used to grip a pulling portion of the stem 15 and to apply the pulling force discussed above.

As noted above, although in the illustrated examples the body head 21 has a domed outer surface, in other examples, the body head may have a different profile, such as a flat top. Similarly, although the illustrated contact face 53 of the installation tool 51 is a concave contact face, in other examples, the contact face may take a different form, provided that there is a gap between the radially inward portion of the body head 21 and the radially inward portion of the contact surface to allow the displacement/deformation necessary for the locking to take place. The surface could for example take the form of a conical or frustoconical surface, or a stepped surface.

In some embodiments, the shank 17 of the body 13 may include a voided section which may promote filling of the apertures in the workpiece members on installation of the fastener 11.

The materials of the body 13 and the stem 15 may be selected so that deformation of the body head 21 is promoted and deformation of the stem 15 is resisted during the setting operation. The body 13 may for example include a relatively soft steel or other suitable material, and the stem 15 may include a relatively hard steel or other suitable material.

What is claimed is:

1. A rivet for fastening workpiece members, the rivet comprising:
    a body comprising a shank extending in a first, longitudinal direction and a head with a portion thereof extending in a second, substantially transverse direction, the transversely extending portion of the head being radially enlarged relative to the shank, a bore being defined through the shank and the head; and,
    a stem comprising a main longitudinal portion arranged for insertion into said bore, and an enlarged portion arranged for radially expanding the shank when the enlarged portion is forced into said bore to fasten the workpiece members;
        the rivet being configured for insertion into respective apertures formed in the workpiece members; and
        wherein the rivet being further configured such that when the workpiece members are fastened, the radially enlarged and transversely extending portion of the head experiences pivotal displacement relative to the shank to engage with the stem to lock the stem in place relative to the body and/or the workpiece members.

2. The rivet of claim 1, wherein the main longitudinal portion of the stem comprises at least one stem locking feature to facilitate the engaging of the head of the body of the rivet with the stem, and
    wherein the body includes a connection point between the head and the shank.

3. The rivet of claim 2, wherein the at least one stem locking feature comprises a stem shoulder and/or a stem groove, and
    wherein the displacement is about the point.

4. The rivet of claim 1, wherein the head of the body of the rivet comprises at least one body locking feature to facilitate the engaging of the head of the body of the rivet with the stem.

5. The rivet of claim 4, wherein the at least one body locking feature comprises an inner body shoulder and/or an inner body groove.

6. The rivet of claim 1, wherein said head has an outer curved or domed profile.

7. The rivet of claim 6, wherein said head has a flat or curved underhead contact surface for abutment against a corresponding respectively flat or curved surface of one of the workpiece members.

8. The rivet of claim 1, wherein said displacement comprises pivoting of at least a portion of the head.

9. The rivet of claim 1, wherein at least a substantial portion of the head undergoes yielding to enable said displacement to lock the stem in place relative to the body and/or the workpiece members.

10. The rivet of claim 1, wherein the body is formed as a single piece and/or is made of steel.

11. The rivet of claim 10, wherein the steel is in an annealed condition.

12. The rivet of claim 1, wherein the stem is formed as a single piece and/or is made from steel.

13. The rivet of claim 12, wherein the steel is in a hardened condition.

14. The rivet of claim 1, wherein the body shank has a plain cylindrical outer profile, or is splined.

15. The rivet of claim 14, wherein the body shank includes a voided section.

16. The rivet of claim 1, wherein the enlarged portion of the stem comprises a tapered section arranged to facilitate the radial expansion of at least part of the body shank.

17. A workpiece comprising a rivet according to claim 1, wherein said workpiece further includes a curved surface for abutment with the head of the body of the rivet.

18. A method of fastening workpiece members using a rivet comprising a body having a shank extending in a first, longitudinal direction and a head with a portion thereof extending in a second, substantially transverse direction, the transversely extending portion of the head being radially enlarged relative to the shank, a bore being defined through the shank and the head of the body, and a stem having a main longitudinal portion arranged for insertion into said bore, and an enlarged portion arranged for radially expanding the shank, the method comprising:
    inserting the rivet into respective apertures formed in the workpiece members;
    forcing the enlarged portion into said bore to fasten the workpiece members; and,
    deforming the shank and pivotally displacing the radially enlarged, substantially transverse portion of the head relative to the shank to engage with the stem to lock the stem in place relative to the body and/or the workpiece members.

19. The method of claim 18, wherein the step of displacing the head of the body relative to the shank to engage with the stem to lock the stem in place relative to the body and/or the workpiece member is performed immediately subsequently to the step of forcing the enlarged portion into the bore to fasten the workpiece members.

20. The method of claim 19, wherein the step of displacing the head of the body relative to the shank to engage with the stem to lock the stem in place relative to the body and/or the workpiece member is performed immediately subsequently to, and as a result of a continuation of a same action responsible for, the step of forcing the enlarged portion into the bore to fasten the workpiece members.

* * * * *